May 30, 1967  N. LAING  3,322,931
FANS
Filed Sept. 28, 1965  13 Sheets-Sheet 3

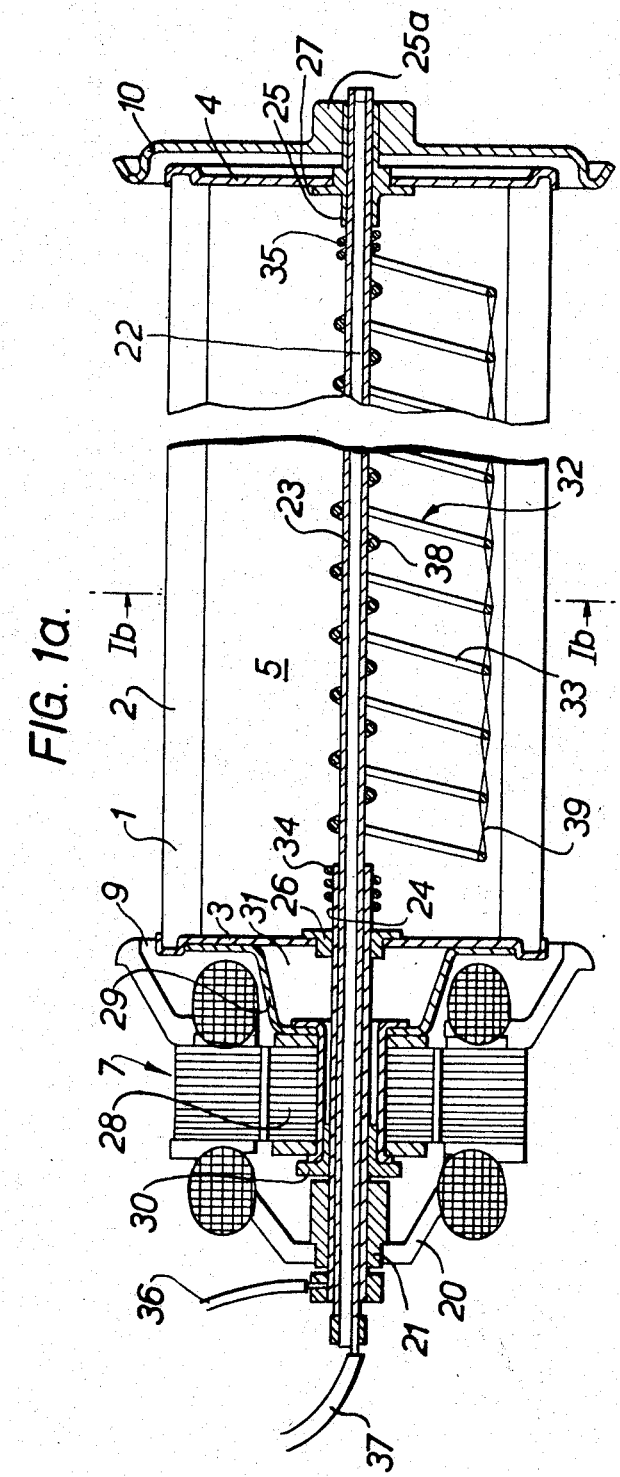

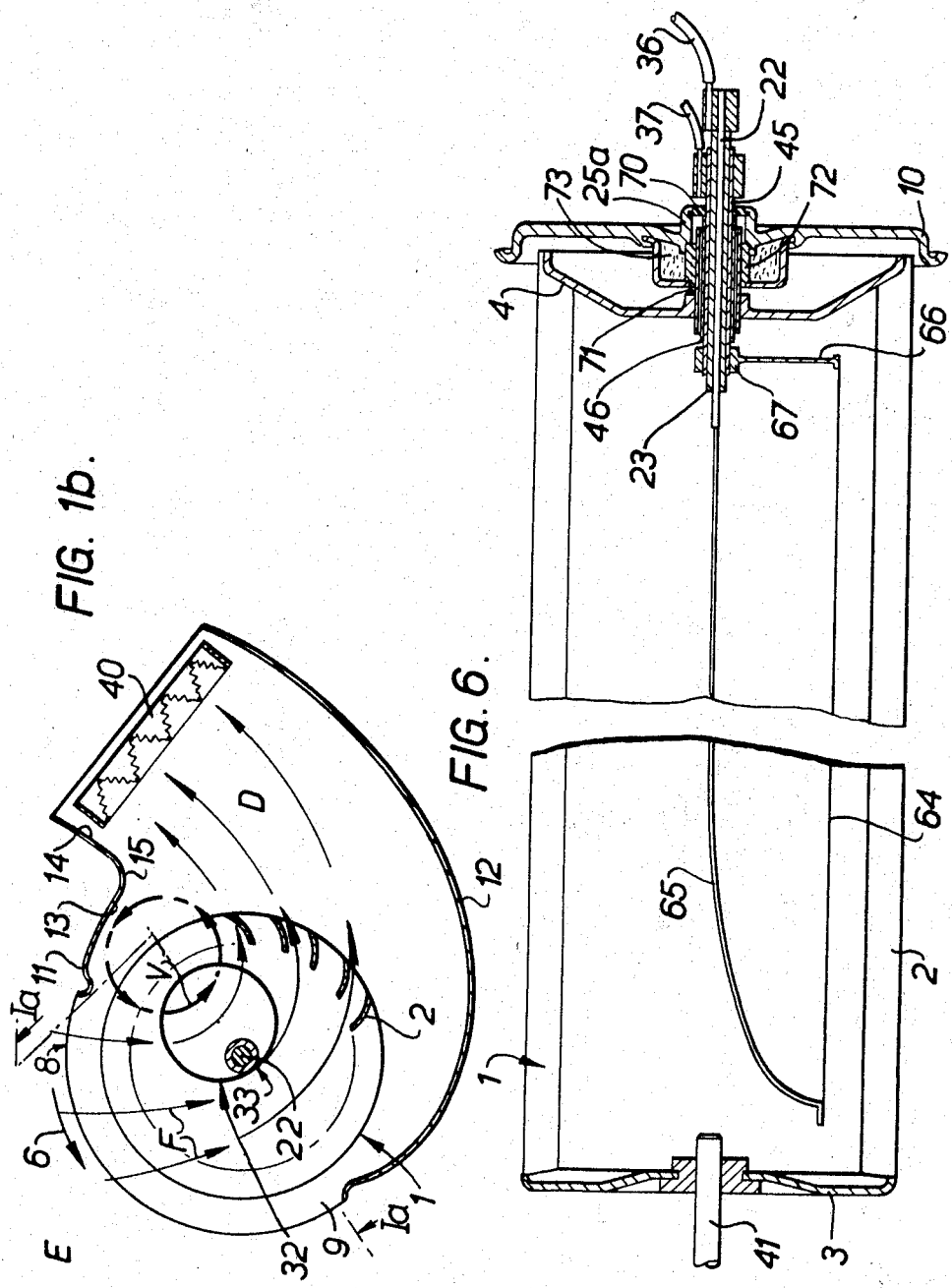

INVENTOR
NIKOLAUS LAING
BY
ATTORNEYS

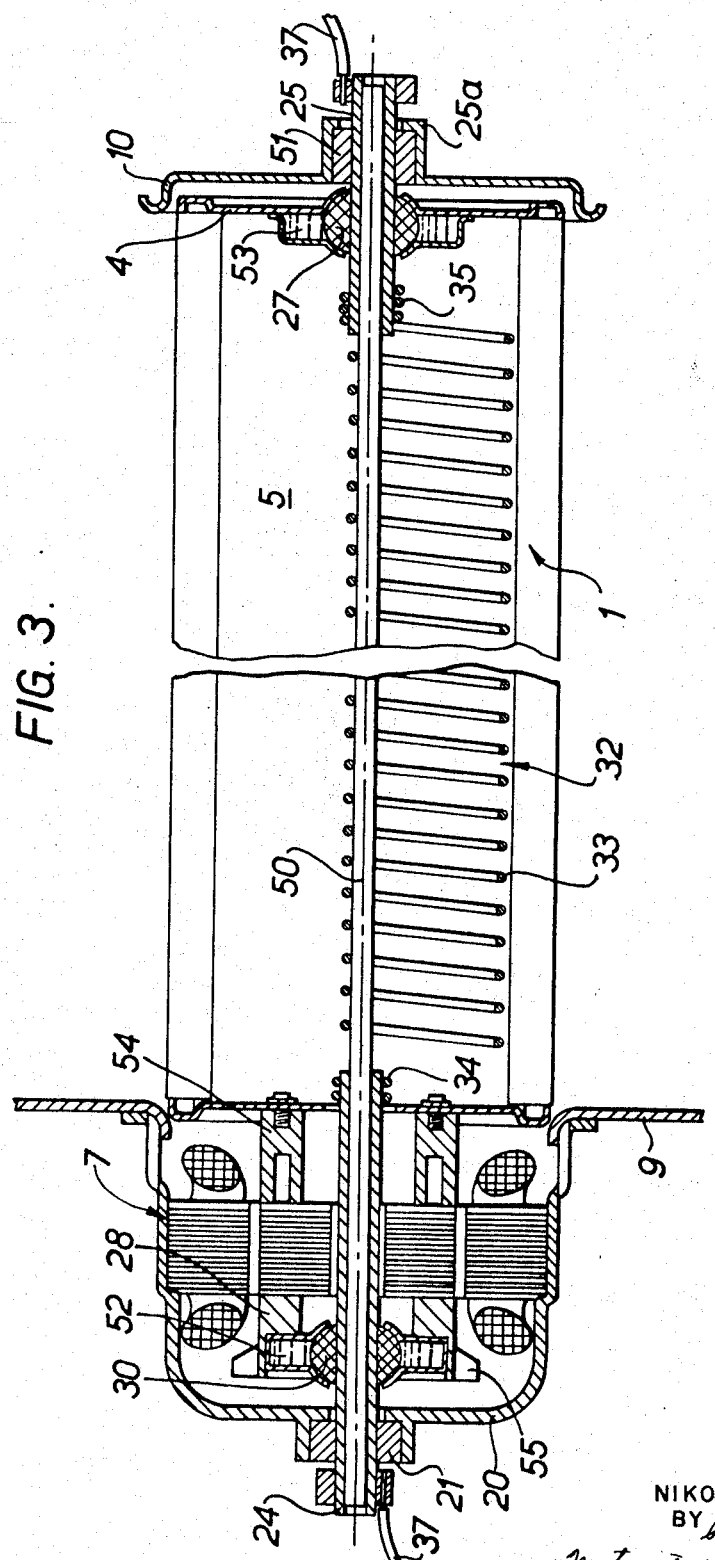

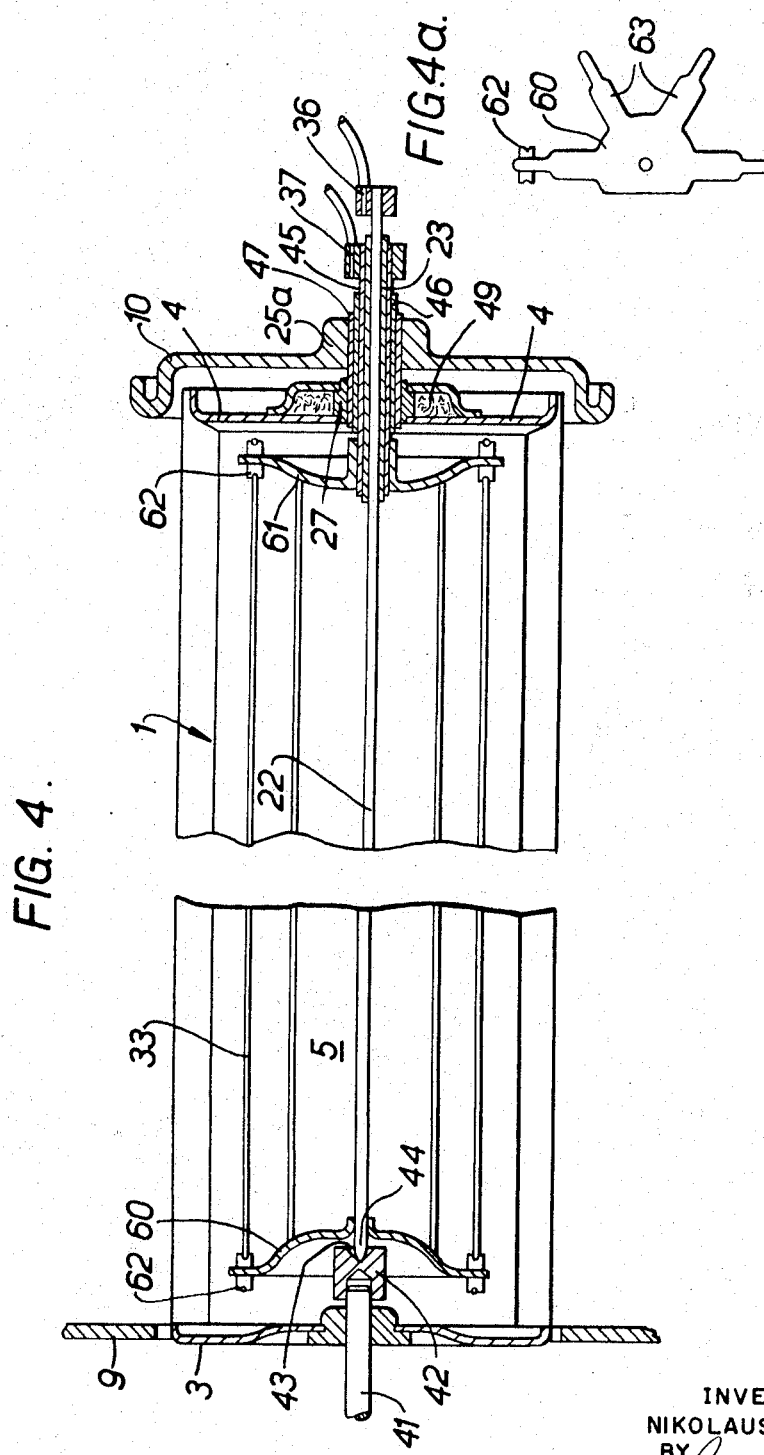

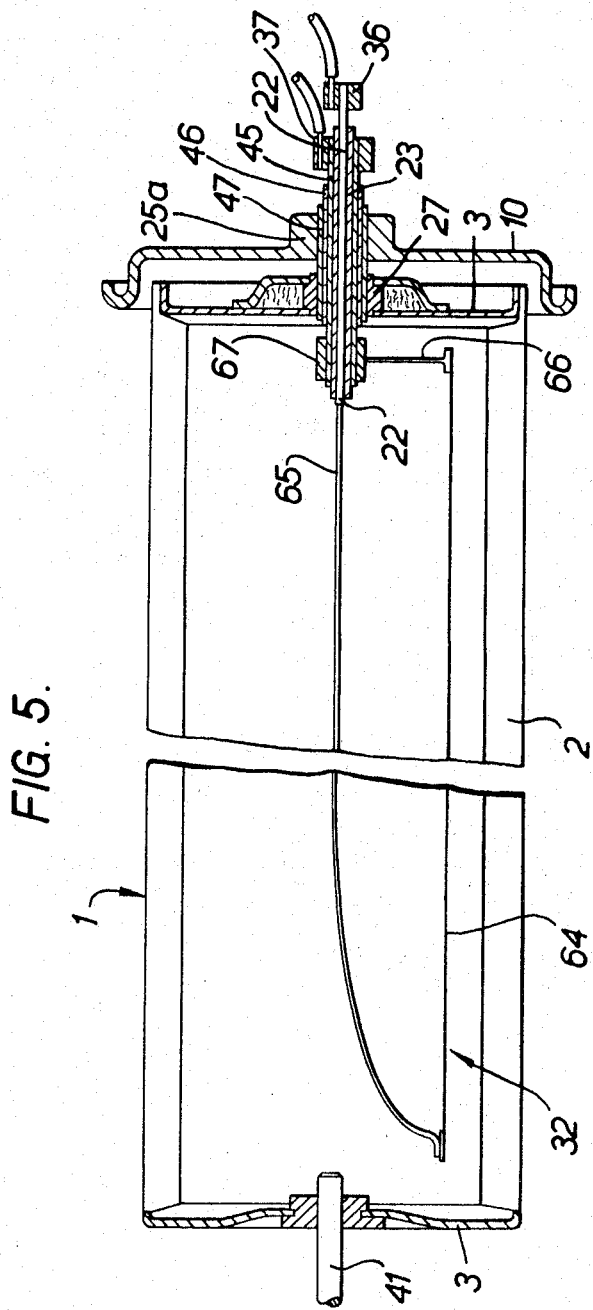

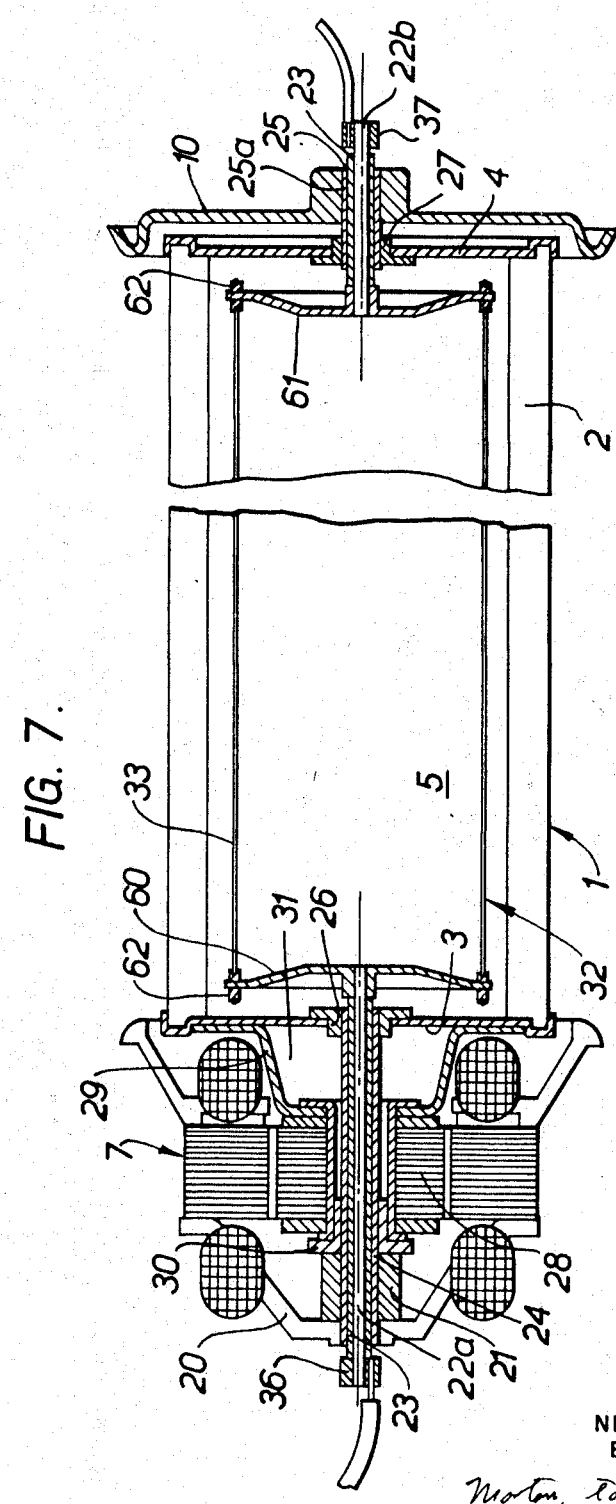

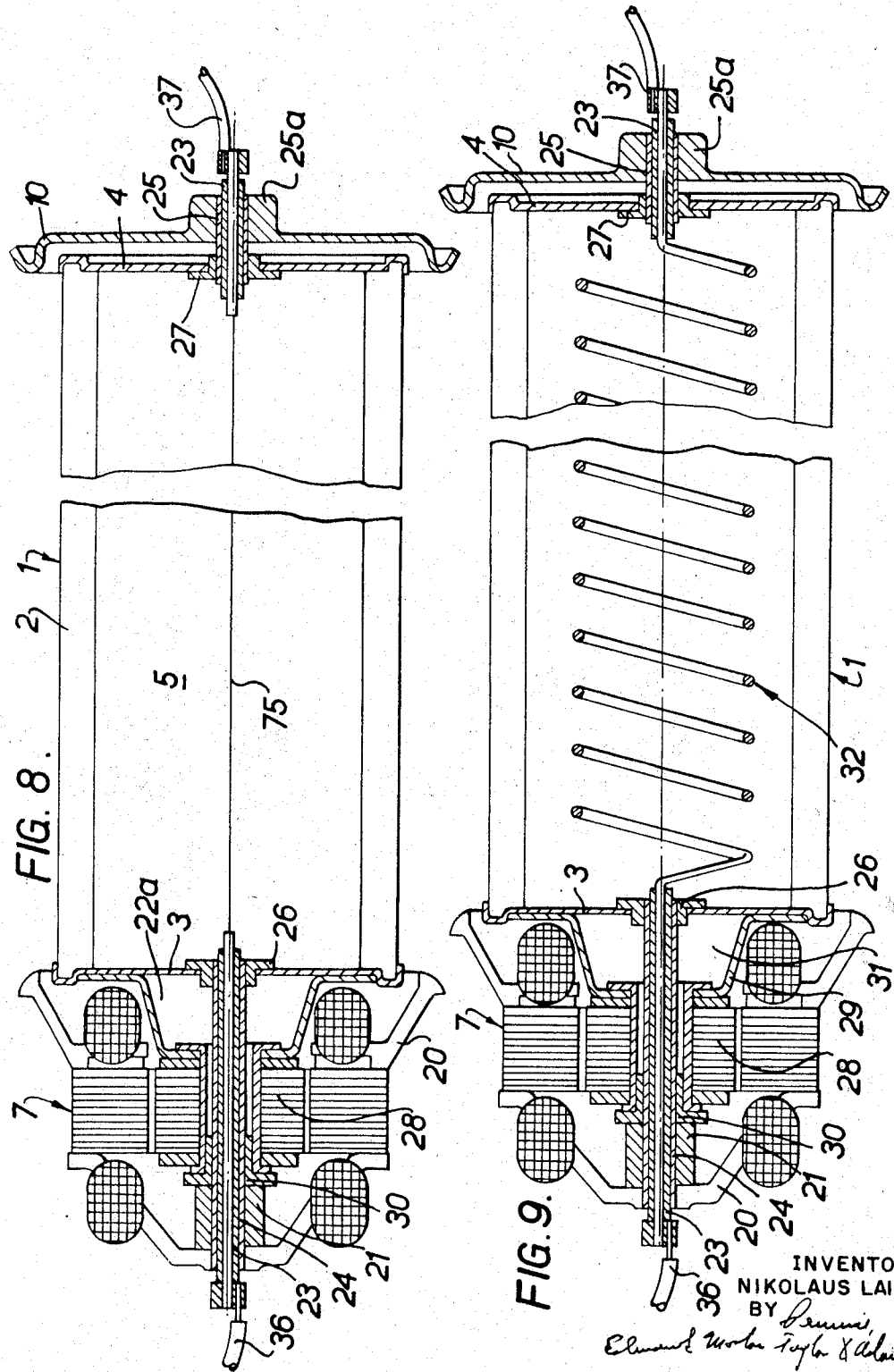

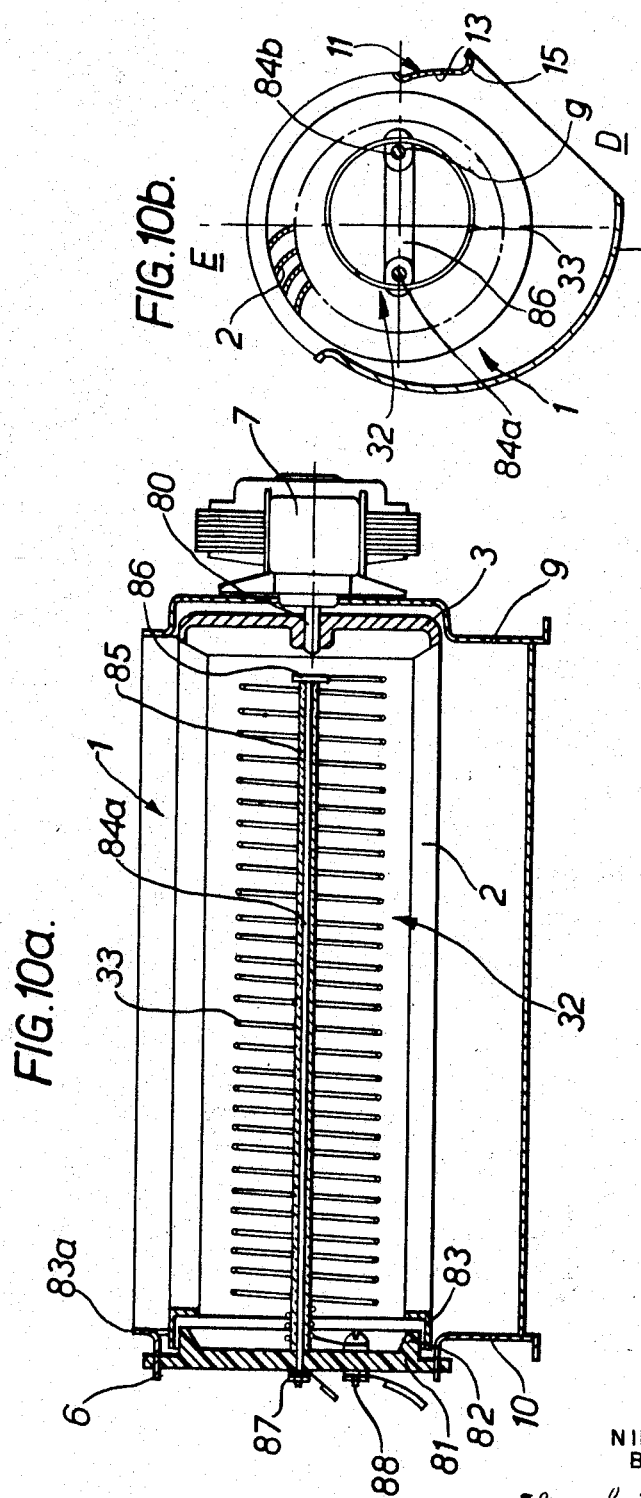

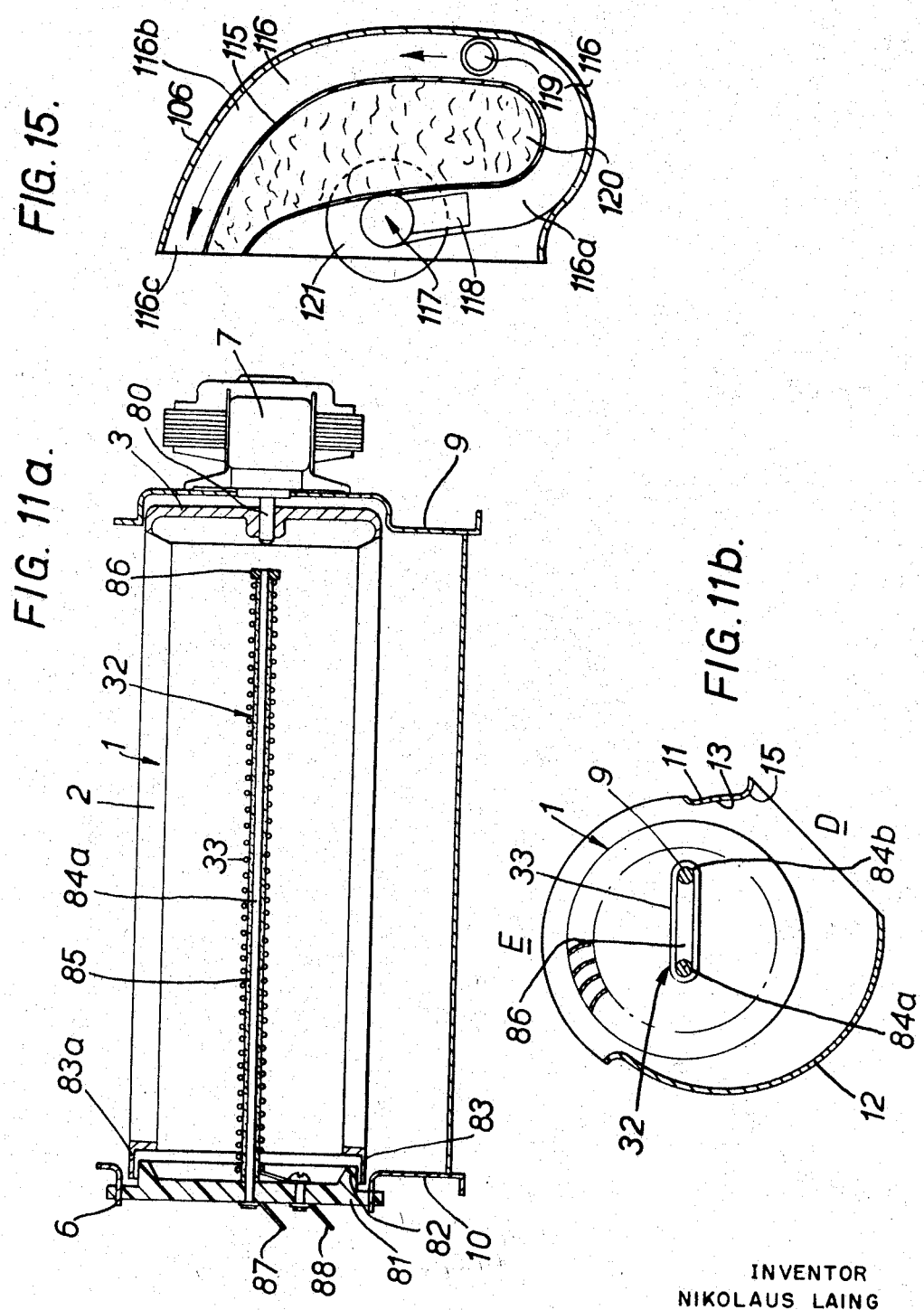

May 30, 1967  N. LAING  3,322,931
FANS

Filed Sept. 28, 1965  13 Sheets-Sheet 11

INVENTOR
NIKOLAUS LAING
BY
ATTORNEYS

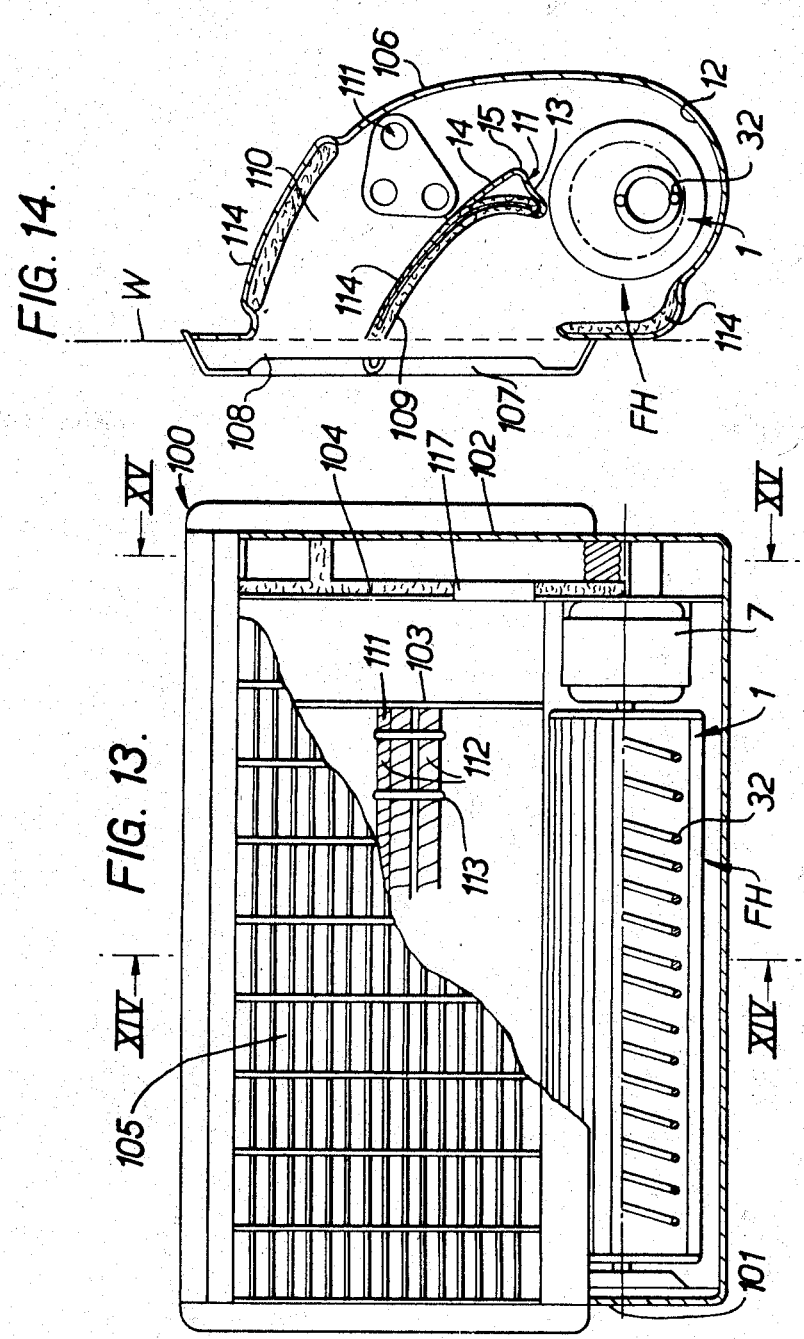

May 30, 1967     N. LAING     3,322,931

FANS

Filed Sept. 28, 1965     13 Sheets-Sheet 13

INVENTOR
Nikolaus Laing
BY
ATTORNEYS

United States Patent Office 3,322,931
Patented May 30, 1967

3,322,931
FANS
Nikolaus Laing, Hofener Weg 35, Aldingen,
near Stuttgart, Germany
Filed Sept. 28, 1965, Ser. No. 490,794
Claims priority, application Germany, Dec. 31, 1956,
L 26,542
16 Claims. (Cl. 219—369)

This invention relates to fans having bladed cylindrical rotors: this application is a continuation-in-part of my copending application No. 221,621 filed Sept. 5, 1962, now Patent No. 3,232,522, which itself is a continuation in part of application No. 671,114 filed July 5, 1957, and now abandoned.

Bladed cylindrical rotors are employed both in centrifugal fans and in cross flow fans. A centrifugal fan comprises a rotor and a housing therefor: in operation air enters the rotor axially through an open end thereof and is discharged radially. A cross flow fan comprises a rotor and guide means cooperating therewith whereby air is induced to pass from an entry region through the path of the rotating blades of the rotor to the interior thereof and thence again through the path of the rotating blades to a discharge region, the ends of the rotor being substantially closed and the flow taking place generally transverse to the rotor axis. Fans operating partially as centrifugal fans and partially as cross flow fans are also contemplated.

In so far as the invention is concerned with cross flow fans it is preferred that the rotor and guide means should be such as to set up in operation a vortex having the general character of a Rankine vortex with its core region eccentric of the rotor axis, the vortex guiding the flow in paths which are strongly curved about the core region: such a fan will be described as "tangential."

The invention is more especially concerned with fans which may suck in lint (i.e. textile fibres or dust), as for example domestic heating fans. Generally speaking all fans employing bladed cylindrical rotors have the disadvantage that lint tends to accumulate at the inner edges of the rotor blades and to mat after a certain time. This matting process increases progressively, as lint accumulating inside the rotor acts like a filter for the air traversing the rotor afterwards, this filter holding up more and more lint the closer it gets. In some circumstances this phenomenon can cause a complete interruption of air flow through the rotor. The accumulation of lint, other things being equal takes place faster with centrifugal fans, where air moves in one direction only (i.e. radially outwards) over the blades, than in cross flow fans, where the air moves in both directions over the blades (i.e. inwards and then outwards) as each blade turns through a full revolution. However, with cross flow fans, unlike those of centrifugal type, the inside of the rotor is not readily accessible for cleaning.

The main object of the invention is to obviate in some measure at least, this problem of lint accumulation.

The invention accordingly provides a fan comprising a bladed cylindrical rotor and guide means cooperating therewith to induce a flow of air from an entry region into the interior of the rotor and thence through the path of the rotating blades to a discharge region, and heating means within the rotor which in operation obtains a temperature high enough to burn lint entering the rotor.

In a fan heater for example, the main or all the heating capacity can be provided within the rotor. The main part of the heat generated is then transferred to the rotor blades by radiation, which then act as secondary heating surfaces of lower temperature. Heat is then transferred into the air flow from the blades. This is particularly advantageous in cross flow fans where, as mentioned above, the air moves in both directions across the blades and thus tends to remove the stagnant heat-insulating boundary layer which would otherwise form; the heat exchange coefficient is much improved for this reason, as compared with an equivalent centrifugal arrangement. However it may be preferred to have only a small portion of the heat capacity within the rotor.

The invention is not limited to fans where heating is desired, but can be applied to all types of fan. For instance a very small heating capacity—such as an individual thin wire which glows in operation may be located inside the rotor. This arrangement is of advantage for air conditioners and suction fans in kitchen or hoods for cooking ranges. According to the invention a heating element may be put in circuit in each working cycle for a short time interval only after which it is switched off. This will help to prevent lint accumulation without wasting electric power or producing unwanted heat.

The invention will be further described by reference to various embodiments thereof given by way of example and illustrated in the accompanying drawings, in which:

FIGS. 1a and 1b are respectively a longitudinal and a transverse section of a cross flow fan according to the invention having heating means within the rotor, the rotor being supported at both ends, the section lines of the figures being shown respectively at Ia—Ia in FIG. 1b and Ib—Ib in FIG. 1a;

FIGS. 2 to 9 are longitudinal sections, some with parts omitted, of cross flow fans which are modifications of that of FIGS. 1a and 1b, showing different forms of heating elements and different ways of supporting and supplying such heating elements;

FIG. 4a is a partial elevation of a spider forming part of the FIG. 4 fan;

Figure 17:
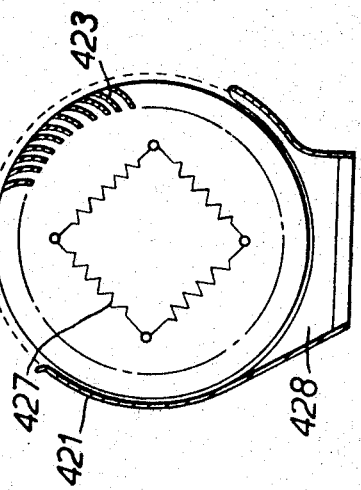
Figure 16:
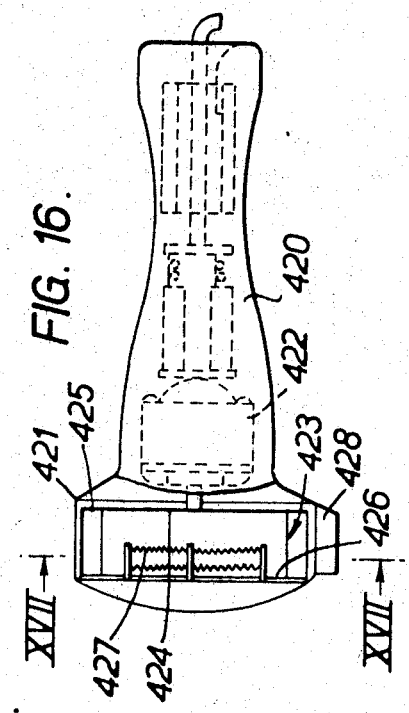
Figure 18:
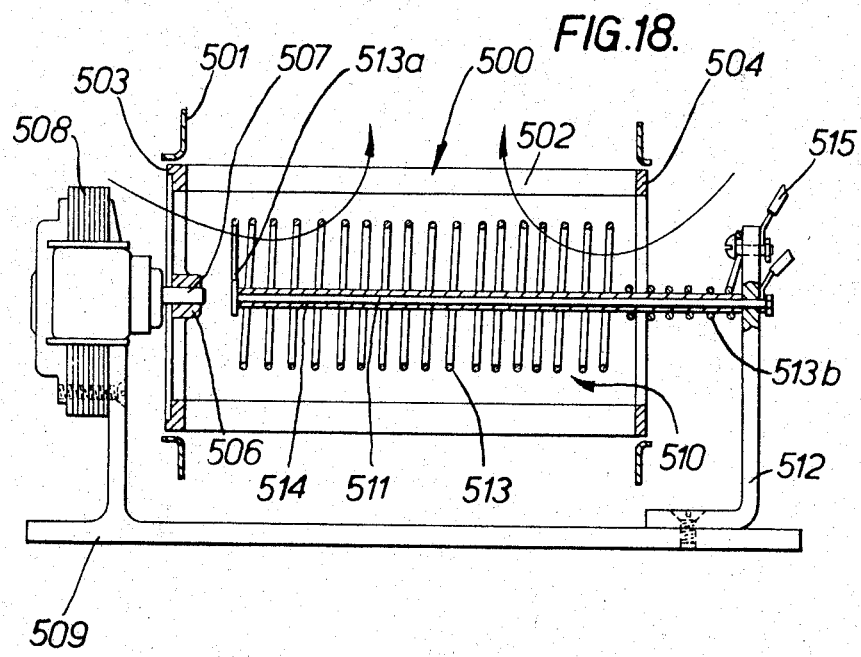
Figure 19:
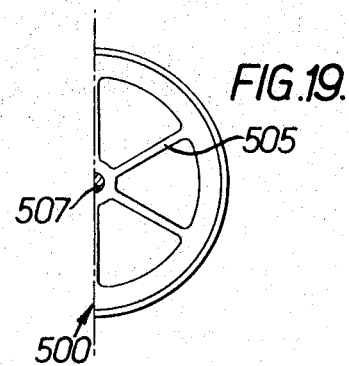

FIGS. 10a and 10b, 11a and 11b, 12a and 12b are three pairs of views similar to FIGS. 1a and 1b, showing three forms of cross flow fan according to the invention wherein the rotor is supported at one end and the heating means at the other;

FIGS. 13, 14 and 15 are respectively a frontal view with parts cut away to show interior details, and two transverse sections taken respectively along the lines XIV—XIV and XV—XV in FIGURE 13;

FIGURES 16 and 17 are respectively a side view with parts sectioned to show interior parts and a transverse section along the line XVII—XVII in FIGURE 16 of a hand-held hair dryer, and FIGURES 18 and 19 are respectively a longitudinal section and a half transverse section of a centrifugal fan according to the invention, the volute being only partly shown in FIGURE 18 and omitted entirely in FIGURE 19.

Referring to the drawings, FIGURES 1a and 1b show a cross flow fan having a rotor 1 comprising a series of similar forwardly curved metallic blades 2 extending parallel to the rotor axis between end support discs 3, 4 and arranged in a ring to define an interior space 5, the support discs providing end closures for this space. The rotor 1 is mounted for rotation about its axis, as will be described, and in operation is driven in the direction of the arrow 6 by a small electric motor of A.C. induction type designated generally 7. A housing designated generally 8 co-operates with the rotor 1 and comprises a pair of generally parallel end walls 9, 10 extending substantially in the planes of the rotor end support discs 3, 4 and first and second guide walls 11, 12 interconnecting the end walls and extending generally parallel to the axis of the rotor axis and well spaced from the periphery thereof. The walls 9, 10, 11, 12 define an entry region E for entry of air to the rotor 1 and a discharge region D where air is discharged from the rotor. The first guide wall 11 has a main portion 13 subtending a small arc at the rotor axis and slightly convergent therewith; remote from the rotor and the wall portion 13 merges into an outlet portion 14 at a rounded nose 15 where the wall portions 13 and 14 form an angle in the region of a rectangle. The guide wall 12 diverges steadily from the rotor 1, going from its line of nearest approach thereto in the direction of rotor rotation. In operation of the fan as so far described the rotor 1 and guide walls 11, 12 cooperate to form and stabilize a vortex approximating to a Rankine vortex and having its core region (indicated schematically at V) inter-penetrating the path of the rotating blades 2 adjacent the main guide portion 13. By reason of the vortex air passes from the entry region E through the path of the rotating blades 2 of the rotor 1 to the interior 5 thereof and thence again through the path of the rotating rotor blades to the discharge region D: the air flow follows paths, indicated schematically at F, F, which are strongly curved about the vortex core region V. However all such flow paths are contained substantially in planes extending perpendicular to the rotor axis. As will be understood, the fan described is a "tangential" fan as above defined.

It is emphasized that the guide walls 11, 12 can have a variety of different forms: thus, the main guide portion 13 of wall 11, or the outlet portion thereof, can be truncated e.g. as in FIG. 10b. A variety of alternative guide means are shown in my copending application No. 221,621 aforesaid.

The frame 20 of the motor 7 is mounted on the housing end wall 9 and carries an insulating bushing 21. A conductive metal rod 22 e.g. of stainless steel or Phosphor bronze surrounded by an insulating tube 23 extends axially of the fan; the ends of the tube 23 are in turn surrounded by metallic sleeves 24, 25 (e.g. of steel or brass plated with hard chromium) which are supported in the bushing 21 at the motor end and a central boss 25a on the end wall 10. The rotor end support disc 3, 4 carry sinter bearings 26, 27 rotating upon the sleeves 24, 25. The armature 28 of the motor 7 has its end adjacent the rotor 1 joined to the end support disc 3 thereof by a cup-shaped member 29 and has its other end supported on a sinter bearing 30 rotating on the metallic sleeve 24: the space 31 between the bearings 30, 26, enclosed by the motor armature 28, member 29 and disc 3 may be filled with oil to form a lubricant reservoir for the sinter bearings 26, 30, the oil being retained by felt rings (not shown) or a lithium compound.

A heating element designated generally 32 is located within the interior 5 of the rotor 1 and has the form of a large-diameter helix of resistance wire 33 supported on the insulating tube 23 with the convolutions widely spaced and opposite ends 34, 35 coiled to grip the bearing sleeve 24 on the one hand and the conductive rod 22 on the other (the insulating tube being gapped for this purpose). Supply wire terminals 36, 37 are attached to the sleeve 24 and conductive rod 22 where they project to the exterior at the motor end of the fan. A string 38 of temperature resistant material such as fibre glass or asbestos is preferably wound around the insulating tube 22 and the convolutions of the helix where they touch this tube, so as to rigidify the heating element: the tube 22 can alternatively be ridged to hold the convolutions in place. The convolutions remote from the tube may also be held by an insulating string 39, as shown.

In operation the heating element 32 is maintained at a temperature high enough to burn lint which enters the rotor. As above mentioned, there are advantages in concentrating the heating capacity of a fan heater within the rotor. However, if only a small part of the heating capacity is within the rotor the resistance wire may be of heavier gauge and thus self-supporting. Heating capacity not within the rotor may be provided in the form of an element (shown conventionally only at 40 in FIGURE 1b) within the discharge region.

In the figures which follow members which in some respects are functionally equivalent will be designated as in FIGURE 1, even if their construction is not identical, and no further detailed description of such members will be required. The description will concentrate on the ways in which subsequent embodiments of the invention differ from that already described: apart from these differences the later embodiments will be understood to operate as described with reference to FIGURES 1a and 1b.

Figure 2:
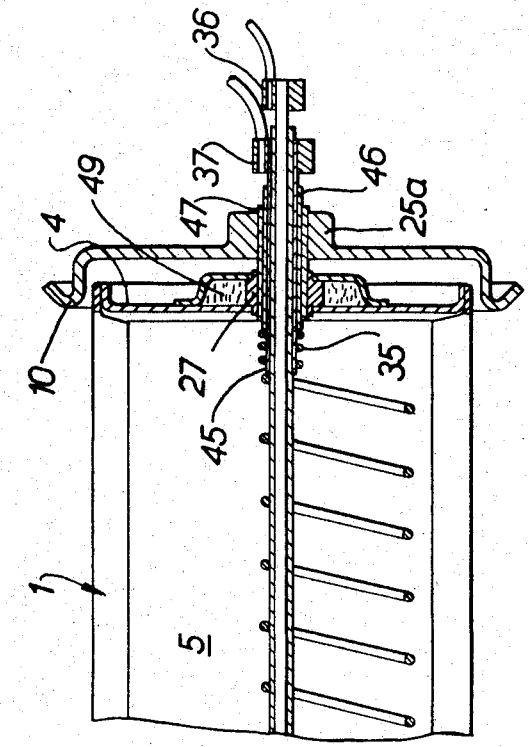

Turning now to FIGURE 2, the rotor 1 there shown has one end support disc 3 mounted on the shaft 41 of a motor (not shown) which carries at its end a heat-resistant insulator bushing 42 with an axial conical depression 43 receiving the coned end 44 of a conductive rod 22 which is surrounded by an insulating tube 23. An inner conductive sleeve 45 surrounds tube 33 at the non-driven end of the rotor and this sleeve is in turn surrounded by a further insulating tube 46 and a metallic bearing sleeve 47. The sleeve 47 mounts the sinter bearing 27 fixed to the rotor end support disc 4 and having an oil reservoir 49, and is fixed in the boss 25a on the housing end wall 10. The heating element 32 has its one end 34 coiled about the rod 22 adjacent its coned end and its other end 35 coiled about the inner conductive sleeve 45. Terminals 36, 37 on the rod 22 and inner conductive sleeve 45 where they project beyond the end wall 10 connect the supply wires to the heating element 32. The FIG. 2 arrangement permits the use of a standard motor; it also provides connections which insulate the rotor 1 and housing 8 instead of having them "live" as in FIG. 1. It is to be appreciated that an insulating sleeve and a bearing sleeve could be introduced in FIGURE 1 to surround the conductive sleeve 24, for the purpose of insulating the rotor and housing. As in FIGS. 1a and 1b, the various concentric elements can be press-fitted or adhesively connected.

FIG. 3 shows an arrangement where the connections to the heater element 32 are taken out at both ends of the fan. In this embodiment the conductive rod 32 of FIGS. 1a and 1b is replaced by a stout insulating rod 50, e.g. of ceramic. Metallic conductive sleeves 24, 25 surround the rod 50 at either end and are fixed respectively in the insulating bushing 21 at the motor end and another insulating bushing 51 at the other end of the fan, supported within the boss 25a on the end wall 10. The bearings 30, 27 (here of self-adjusting type with individual lubricant reservoirs 52, 53) rotate upon the sleeves 24, 25, as in FIG. 1a, but the bearing 26 of FIG. 1a is dispensed with and the motor armature 28 is rigidly secured to the adjacent rotor end support disc 3 through an insulating ring 54. The heating element 32 has its ends 34, 35 coiled about the inner ends of the sleeves 24, 25 and their projecting ends carry the supply terminals 36, 37. In this arrangement the motor armature 28 and rotor 1 are "live" but the housing is not. Various further differences between the FIG. 3 fan and that of FIG. 1 can be seen in the drawing: thus, a ring of projections 55 surrounds the armature, which can be broken off for balancing purposes and which induce a flow of air for cooling the motor.

The FIG. 4 fan is similar to that of FIG. 2 except as regards the heating element 32, and similar parts will be designated by the same reference numerals without further specific description. The heating element 32 here comprises a pair of spiders 60, 61 (FIG. 4a) of spring material carrying insulators 62 on the tips of their arms 63, with the resistance wire 33 strung in zig-zag manner longitudinally of the rotor 1 under tension around these insulators. Electrical connection to the resistance wire 33 is made through the spiders 60, 61 which are mounted respectively on the end of the rod 22 adjacent the motor shaft 14 and, at the other end of the rotor, on the inner end of the inner sleeve 46, the rod and inner sleeve carrying the supply terminals 36, 37 as in FIGURE 2. The arrangement is advantageous for suction fans in kitchens for example, when control means may be provided to energize the element 32 for a short time before the motor is started: the blades 2 are thus heated and when the rotor turns in the now fluid grease, and dirt particles adhering therein are flung out. Since the resistance wire 32 is well clear of the rod 22 the insulating tube may, as shown, terminate at the non-driven end of the rotor 1.

FIG. 5 shows an arrangement which is again similar to FIG. 2 at the non-driven end of the rotor 1, and once again differs from FIG. 2 chiefly as regards the heating element 32: once again similar references will be used. The heating element 32 in FIG. 5 has the form of a single thin wire 64 supported parallel to the rotor axis and close to the blades between a whip-like extension 65 of the central rod 22 and a rigid conducting radial arm 66 projecting from a bush 67 secured on the inner end of the inner sleeve 46. The whip-like extension 65, which is made of a springy material, e.g. spring steel or Phosphor bronze, ensures that the resistor wire 64 is maintained in tension. Electrical connection of the element 32 is achieved through the extension 65 to the rod 22 on the one hand and through the arm 66 and bush 67 to the sleeve 46 on the other. The heater element 32 of this arrangement can advantageously be put in series, possibly for a short time only in each operating cycle, with another heating element. The arrangement can be used in air conditioners, for example, where a minimum disturbance of air flow is desirable. Since the rod 22 does not project through the rotor 1, there is no need for the insulator block 42 shown in FIGURE 2 on the end of the motor shaft 41.

FIGURE 6 shows a somewhat similar arrangement, differing chiefly in the means for supporting the non-driven end of the rotor: once again similar parts will be similarly designated without further description. Here the inner coaxial assembly of rod 22, insulating tube 23, inner sleeve 45 and insulating sleeve 46 thereon is supported by annular member 70 on the boss 25a on the housing end wall 10, which may be made of plastics material. However, instead of the rotor end support disc 4 carrying a bearing rotating on a bearing sleeve secured about the insulating sleeve 46, as in FIGURES 2 and 5, the disc is secured on a tubular shaft 71 which is journalled in a sinter bearing 72 projecting inwardly of the end wall 10 and having a lubricant reservoir 73, the shaft 71 surrounding the sleeve 46 but in spaced relation thereto.

FIGURE 7 shows an embodiment of the invention which combines features from FIGURE 1a, FIGURE 3 and FIGURE 4: references from those figures will be used. In this embodiment the heating element 32 is as in FIGURE 4, but is supported and supplied with current from opposite ends of the rotor. Since the element 32 does not require an axial support within the rotor, the rod 22 is divided into two parts, one 22a at the motor end and the other 22b at the non-driven end. The spiders 60, 61 of the heating element are secured on the inner ends of the rods 22a, 22b the outer ends of which carry the supply terminals 36, 37. The end bearing ararngements of the fan are similar to those of FIGURE 1a, except for the electrical connections. If desired the resistance wire 33 can be criss-crossed between the spiders 60, 61.

FIGURE 8 shows an arrangement similar to that of FIGURE 7, except that the heating element of FIGURE 7 is replaced by a single wire 75 stretched between the inner ends of the rods 22a, 22b. This arrangement is suitable for use with the wire 75 in series with some other heating element.

In both FIGURES 7 and 8 it is desirable to secure the rods 22a and 22b to the housing so that they exert a tension on the resistance wire or wires.

FIGURE 9 shows yet another arrangement, generally similar to that of FIGURE 8 except that the heating element 32 is formed by a helix of stiff wire of substantial diameter whose ends provide the rods 22a and 22b.

FIGURES 10a and 10b show a fan similar to that of FIGURES 1a and 1b but differing chiefly in that the rotor 1 is supported from one end only while the heating element is supported and connected solely from the other end of the fan. The motor 7 is, as in FIGURES 1a and 1b mounted on the outside of the housing end wall 9: it may be of standard type. The rotor 1 is very rigid and has a stout end support disc 3 mounted on the end of the motor shaft 80. The housing end wall 10 has a circular insulating insert 81 presenting an internal axial flange 82 to the rotor. The adjacent end of the rotor carries, instead of a disc as in previous embodiments, a support ring 83. This support ring 83 has an outwardly directed axial flange 83a surrounding the flange 82 on the insert in spaced relation thereto. In normal operation the flanges 82, 83 co-operate to prevent any substantial movement of air into the open end of the rotor, so that the end wall insert 81 forms the end closure for the rotor. The flanges 82, 83 do not normally touch, but if the fan is jerked or dropped they prevent deformations beyond the elastic limit such as would permanently damage the fan, or bring the rotor into contact with live parts. The heating element 32 comprises a helix of stiff resistance wire 33 supported within the rotor 1 on a pair of stout metallic bars 84a, 84b surrounded by insulating tubes 85 and extending the length of the rotor parallel to the axis thereof in a common diametral plane. As in previous embodiments, the insulating tubes 85 may be corrugated to help locate the convolutions of the helix, and may comprise beads threaded on the bars 84a, 84b. The bars 84a, 84b are firmly secured to the insulating insert 81 in the housing end wall 10 and linked at their free ends by a cross piece 86. One bar 84a forms a supply terminal 87 at its secured end, which projects through the insert to the exterior, and the end of the resistance wire 33 adjacent the motor is connected to the free end of this bar through the cross piece 86. The end of the resistance wire 33 adjacent the housing end wall 10 is brought out to a supply terminal 88 on the insert 81.

FIGURES 11a and 11b show an arrangement similar to that just described where however the resistance wire 33 is wound around and stretched between the bars 84a, 84b rather than formed into a helix. This arrangement is suitable for finer, less stiff wire.

Figure 12B:
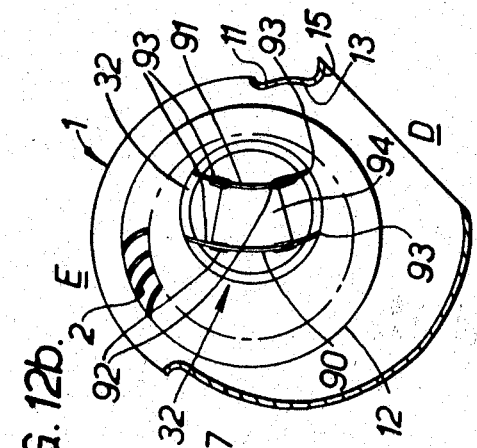
Figure 12A:
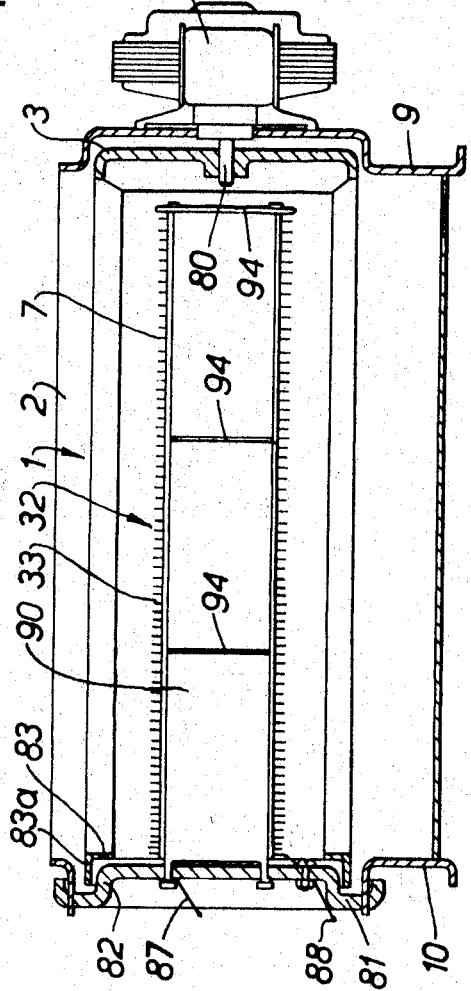

FIGURES 12a, 12b show another arrangement similar to that of FIGURES 11a and 11b, and differing only in the form of heating element. In previous embodiments of the invention, the resistance wire 33 has been of normal round cross-section. Here the wire 33 is a flat strip wound edgewise into a helix about carrier members 90, 91 secured to the insert 81 in the housing end wall 10 and projecting into the rotor. Each carrier member 90, 91 is made up of a curved sheet metal support element 92 carrying at its edges a strip 93 of mica or other insulator, the strips continuing the curve of the support element and having notched edges receiving and locating the convolutions of the helix. Rigidifying connector strips 94 extend at intervals between the support elements 92 in planes perpendicular to the rotor axis. One support element 92 provides a supply terminal 87 where it projects through the end wall insert 81, and the end of the resistor strip 33 adjacent the motor 7 is connected to this support element through the connector strip 94 at the free end of the support elements. The other end of the resistor strip 33 is brought out to the terminal 88 on the insert 81, as in previous embodiments. It will be appreciated that air flow through the rotor 1 of FIGURES 12a and 12b takes place in the same manner as is described above in detail with reference to FIGURE 1b. It is to be noticed that the carrier members 90, 91 are curved approximately in the same sense as the flow lines adjacent the vortex core, so that resistance to flow is minimized. The resistance strip 33 presents its edge to flow, and this also mnimizes resistance to flow. Heating elements comprising a helix of edge-wound resistor strip are described in my United States patent application Ser. No. 164,958 filed Jan. 8, 1962.

Referring now to FIGURES 13, 14 and 15, there is shown a room heater to be built into a wall indicated at W in chain lines. The room heater incorporates a fan heater, here designated FH, which may be as described with reference to any of the foregoing figures, but preferably one having a heating element with a helically wound resistor strip capable of dissipating continuously a substantial wattage. The motor, rotor and heating element of the fan heater FH are designated by the reference numerals previously used, viz 7, 1, 32 respectively. The housing of the room heater, designated generally 100, provides the guide walls 11, 12 of previous embodiments.

The room heater housing 100 has end walls 101, 102 and interior partition walls 103, 104 extending parallel to one another between a front grille 105 and a rear wall 106 which curves around from adjacent the top edge of the grille rearwardly thereof and then back up again to the lower edge of the grille. The rotor 1 extends substantially between the end wall 101 and partition wall 103. Between these walls the grille provides coplanar inlet and outlet openings 107, 108 divided one from another by an internal longitudinally extending wall 109 which extends down to the rotor 1 and forms the guide wall 11 previously mentioned, the lower part of the rear housing wall 106 providing the guide wall 12. The rotor 1 in operation induces a flow of air through the inlet opening 107, twice through the path of the rotating blades 2 of the rotor and back to the outlet opening 108 through an outlet duct 110 formed between the upper side of the internal wall 109 and the upper part of the rear housing wall 106. A second heating element 111 extends between the housing end wall 101 and the partition wall 103 within the outlet duct 110, and comprises a resistor wire 112 wound upon a support structure indicated generally at 113. Insulation 114 is provided on the rear wall 106 and internal wall 109 to prevent undue heating thereof, and particularly of the rear wall where it might come into contact with wooden structural members of the room wall W.

The motor 7 is located in the space between the partition walls 103, 104, which space communicates with the inlet opening 107. The space between the partition wall 104 and the housing end wall 102 is devoted to a thermostat arrangement which will now be described. A wall 115 which, very roughly, is U-shaped, extends longitudinally between walls 104, 102 and defines with the rear housing wall 106 a channel 116 which is also very roughly U-shaped. The front limb 116a of this channel communicates, through a hole 117 in the partition wall 104 with the inlet opening 107, and contains a thermostat 118. The rear limb 116b of the channel 116 has an outlet 116c at the top and contains a small electric heater element 119 so disposed that it cannot radiate heat to the thermostat: the space enclosed by the U-shaped wall 115 is filled with insulating medium 120 to further limit heat transference between the element 119 and the thermostat, and additional insulation may be provided to prevent the heating elements 32 and 111 from affecting the thermostat. In operation, the small heating element 119 induces a draught in the U-shaped channel 116 which causes a continual flow of fresh air from the room past the thermostat 118, so that the latter responds promptly to the temperature conditions therein, and is unaffected by heat transference from the various heating elements. The thermostat may be set by a wheel 121 projecting to the front of the heater, and may be connected to operate either the element 32 or (preferably) the element 111.

If desired in special applications the blades of the rotor can be so formed and spaced that the heating element within it, which may be glowing, cannot be seen by an observer. In this case the blades receive substantial radiation. The blades can also be formed and spaced so that the heating element is in operation clearly visible, when substantial radiation passes to the exterior of the rotor. Intermediate arrangements are also possible.

The motor 7 in the various embodiments described can be protected from radiation by making the end support disc 3 reflecting on the side facing the rotor, or by placing a reflecting baffle between the rotor and the motor, which baffle may be fixed or rotate with the rotor.

It is to be understood that various features of the different embodiments can be combined in different ways without departing from the scope of the invention. Various combinations have been illustrated: in the light of these illustrations the skilled reader can envisage other combinations. In particular it will be appreciated that various embodiments described could be adapted for centrifugal fans.

The invention is shown applied to a hair dryer, as shown in FIGURES 16 and 17. The device there shown comprises a handle 420 carrying a short coaxial shroud 421 of comparatively large diameter. Within the handle is mounted an electric motor 422 driving a bladed rotor 423 located coaxially within the shroud 421 and closed at the motor end by a disc 424 which supports the blades 425. An end wall 426 of the device secured to the shroud 421 approximately closes the other end of the rotor 423 and supports within it a pair of heater coils 427. Air is delivered through the outlet 428. Although the heater coils 427 obstruct to some extent the free flow of air through the rotor 423, the construction described secures the advantage of adequately protecting the heater coils without special housing elements or protective devices. It will be understood that rotor 423 and surrounding parts of the shroud co-operate in the general manner of the corresponding parts of FIGURES 1a and 1b.

Referring now to FIGURES 18 and 19 there is shown a centrifugal fan comprising a bladed cylindrical rotor 500 co-operating in conventional manner with a volute 501, shown only in part. The rotor 500 has its blades 502 supported on end members 503, 504 allowing substantially free entry of air axially into the rotor at both ends, whence it is discharged through the blades, as indicated by the arrows. One of the end members 503 includes spokes 505 radiating from a central bushing 506 which is mounted on the shaft 507 of a driving motor 508 supported on a base 509. The other rotor end member 504 is a ring, and a heater element designated generally 510 is mounted within the rotor 500 upon a supporting rod 511 extending axially of the rotor through the end member 504 and supported on a bracket 512 upstanding from the base 509. The rod 511 may be insulated from the bracket by means not shown. The element 510 comprises a coil of resistor wire 513 wound helically concentrically with the rotor axis, and having one end 513a fixed to the free end of the rod 511 and the other end 513b wrapped about a tubular insulating member 514 surrounding the rod. The rod 511 forms at the bracket 512 one terminal for the element 510 while the wrapped end of the wire 513 is brought to a terminal 515 adjacent thereto.

This embodiment of the invention functions generally similarly to those previously described, except for the difference in the manner of air flow.

It will be understood that some of the embodiments illustrated in FIGURES 1 to 17 may be modified for operation as centrifugal fans whether of the single ended or double ended type.

I claim:
1. A fan comprising a motor, a bladed cylindrical rotor coaxial with and directly driven by the motor in one direction, means for closing both ends of the rotor and guide means external to the rotor including end walls extending generally in the planes of the ends of the rotor and a pair of guide walls extending between the end walls and defining an entry region and a discharge region, said guide walls cooperating with the rotor when rotated by said rotor to induce a flow of air from the entry region through the path of the rotating blades to the interior of the rotor and thence again through the path of the rotating blades to the discharge region, an electric heating element mounted within the rotor, said rotor being mounted on bearings at either end, support means for the heating element which comprise a stationary conductive support member extending axially of the rotor through at least one end bearing towards the opposite end of the rotor and there being connected to one end of said element, an insulating sleeve on the support member where it passes through said one bearing, a conductive sleeve on said insulating sleeve, the other end of said element being connected to the conductive sleeve, and supply conductors connected to the support member and said conductive sleeve.

2. A fan as claimed in claim 1, wherein said one rotor bearing rotates on the conductive sleeve.

3. A fan as claimed in claim 1, wherein an insulating sleeve and a bearing sleeve surround the conductive sleeve and said one rotor bearing rotates on the bearing sleeve.

4. A fan as claimed in claim 1, wherein the conductive sleeve is connected to its supply conductor at said one end of the rotor and the support member is connected to its supply conductor at the other end of the rotor.

5. A fan as claimed in claim 1, wherein the conductive sleeve is connected to its supply conductor at said one end of the rotor and the support member is connected to its supply conductor also at said one end of the rotor.

6. A fan as claimed in claim 1, wherein the heating element has the form of a helix supported at one side by the support element.

7. A fan as claimed in claim 1, wherein the heating element comprises longitudinally extending wires mounted on spiders, one on the support member and the other on the conductive sleeve.

8. A fan as claimed in claim 1, wherein the support member includes a springy part and the heating element comprises a wire tensioned by reason of said springy part between the end of the support member and an element projecting from the conductive sleeve.

9. A fan comprising a motor, a bladed cylindrical rotor coaxial with and directly driven by the motor in one direction, means for closing both ends of the rotor and guide means external to the rotor including end walls extending generally in the planes of the ends of the rotor and a pair of guide walls extending between the end walls and defining an entry region and a discharge region, said guide walls cooperating with the rotor when rotated by said motor to induce a flow of air from the entry region through the path of the rotating blades to the interior of the rotor and thence again through the path of the rotating blades to the discharge region, an electric heating element mounted within the rotor; said rotor being mounted on bearings at either end, and support means being provided for the heating element which comprise a stationary member extending axially of the rotor through the motor and through said rotor bearings and forming at least one electrical connection to the element.

10. A fan comprising a motor, a bladed cylindrical rotor coaxial with and directly driven by the motor in one direction, said rotor being closed at one end and its open end carrying a support having an outwardly directed circular flange guide means external to the rotor including end walls extending generally in the planes of the ends of the rotor and a pair of guide walls extending between the end walls and defining an entry region and a discharge region, said guide walls cooperating with the rotor when rotated by said rotor to induce a flow of air from the entry region through the path of the rotating blades to the interior of the rotor and thence again through the path of the rotating blades to the discharge region, an electric heating element mounted within the rotor; said rotor being overhung-mounted by its closed end on the motor and having its opposite end open, and means for closing said open end of the rotor comprising a portion of the respective end wall closely adjacent the open end of the rotor having an inwardly directed circular axial flange with said inwardly directed flange and said outwardly directed flange being closely telescopically received one within the other to cooperate to prevent movement of air into the open end of the rotor, and said heating element being overhung-mounted within the rotor on said end wall portion and being substantially coextensive in length with the rotor.

11. A fan as claimed in claim 10, wherein support means are provided for the heating element in the form of a pair of electrical insulated support members extending from said end wall portion and having a resistance wire wound about them.

12. A fan as claimed in claim 11, wherein one of said support members provides an electrical connection for the inner end of the helix.

13. A fan comprising a motor, a bladed cylindrical rotor coaxial with and directly driven by the motor in one direction, and guide means external to the rotor including end walls extending generally in the planes of the ends of the rotor and a pair of guide walls extending between the end walls and defining an entry region and a discharge region, said guide walls cooperating with the rotor when rotated by said rotor to induce a flow of air from the entry region through the path of the rotating blades to the interior of the rotor and thence again through the path of the rotating blades to the discharge region, bearing means rotatably mounting the rotor at both ends, a pair of stationary conductive support elements extending coaxially through the bearing means at at least one end of the rotor, means insulating the conductive support elements from one another, and an electric heating element within the rotor secured to the respective support elements at opposite ends of the rotor, said support elements both mounting and supplying current to said heating element.

14. A fan as claimed in claim 13 wherein said electric heating element is in the form of a helix.

15. A fan according to claim 13 wherein said electric heating element comprises at least one wire extending in a plane containing said rotor axis.

16. A fan comprising a motor; a bladed cylindrical rotor coaxial with an directly driven by the motor in one direction; means for closing both ends of the rotor; guide means external to the rotor including end walls extending generally in the planes of the ends of the rotor; a pair of guide walls extending between the end walls and defining an entry region and a discharge region of the fan, said guide walls cooperating with the rotor when rotated by said motor to induce a flow of air from the entry region through the path of the rotating blades to the interior of the rotor and thence again through the path of the rotating blades to the discharge region; an electric heating element mounted within the rotor and extending axially with respect thereto; bearing means rotatably supporting at least one end of said rotor; and heater element support means comprising a member extending axially of the rotor and extending through at least one bearing means, said member forming at least one electrical connection to the heating element.

References Cited

UNITED STATES PATENTS

| | | | |
|---|---|---|---|
| 1,867,807 | 7/1932 | Campbell. | |
| 1,868,905 | 7/1932 | Kelley | 219—371 |
| 1,901,038 | 3/1933 | Marshall | 219—366 |
| 1,920,952 | 8/1933 | Anderson. | |
| 2,008,183 | 7/1935 | McCord | 219—371 |
| 2,276,144 | 3/1942 | Bergstrom | 219—373 |
| 2,475,910 | 7/1949 | Morrison | 219—369 X |
| 2,614,201 | 10/1952 | Varis | 219—369 |
| 3,026,401 | 3/1962 | Cheviron | 219—369 X |

ANTHONY BARTIS, *Primary Examiner.*